United States Patent [19]

Nozawa et al.

[11] Patent Number: 4,511,975
[45] Date of Patent: Apr. 16, 1985

[54] NUMERICAL CONTROL MACHINE TOOL

[75] Inventors: Ryoichiro Nozawa, Tokyo; Tsuyoshi Nagamine, Hachioji; Hideaki Kawamura, Hachioji; Mitsuto Miyata, Hachioji, all of Japan

[73] Assignee: Fanuc Ltd, Minamitsuru, Japan

[21] Appl. No.: 387,848

[22] PCT Filed: Sep. 21, 1981

[86] PCT No.: PCT/JP81/00242
§ 371 Date: May 21, 1982
§ 102(e) Date: May 21, 1982

[87] PCT Pub. No.: WO82/01262
PCT Pub. Date: Apr. 15, 1982

[30] Foreign Application Priority Data

Sep. 25, 1980 [JP] Japan ............................... 55-133330

[51] Int. Cl.$^3$ ....................... G06F 15/46; G05B 23/02
[52] U.S. Cl. ........................... 364/474; 364/167; 364/185; 371/20; 371/49
[58] Field of Search ............... 364/183, 167–171, 364/474, 475, 184–187; 371/16, 20, 21, 27, 49–51, 67, 71

[56] References Cited

U.S. PATENT DOCUMENTS 4,118,771 10/1978 Pomella et al. ................. 364/474 X
4,229,804 10/1980 Kobayashi et al. ............. 364/474 X
4,291,388 9/1981 Ecker, Jr. et al. .................. 364/900
4,328,448 5/1982 Berenberg et al. ............. 364/474 X Primary Examiner—Joseph Ruggiero
Attorney, Agent, or Firm—Staas & Halsey

[57] ABSTRACT

The present invention pertains to improvements in signal transmitting and receiving equipment for transmitting and receiving signals regarding the M, S and T functions between a numerical controller and a machine tool. Numeric codes ($c_l$ to $c_n$) that are sent from the NC apparatus to the machine tool are added or combined with a redundant signal (pt) for checking the validity thereof. Only when it is decided that the received codes are valid, based on the added signals, is the machine tool operated. With such an arrangement, even if a parallel transmission system using many signal lines is employed it is possible to offer an NC machine tool which is capable of preventing erroneous operations related to the M, S and T functions, and hence the NC machine tool has high reliability.

3 Claims, 2 Drawing Figures

NUMERICAL CONTROL MACHINE TOOL

BACKGROUND OF THE INVENTION

The present invention relates to a numerical control machine tool, and more particularly to improvements in signal transmitting and receiving equipment which performs transmission and reception of signals regarding M, S and T functions between a numerical controller and a machine tool.

Equipping a numerical controller (hereinafter referred to as an NC apparatus) with M, S, and T functions so as to improve its performance as an NC machine tool has heretofore been known. The M function is one that performs ON-OFF control for starting and stopping the rotation of a spindle, turning ON and OFF of a coolant and so forth in accordance with commands stored on a command tape. The S and T functions are those for similarly controlling the number of revolutions of the spindle and controlling the tool selection in accordance with commands stored on the command tape. These functions are performed by sending out signals regarding the M, S and T functions as relay contact signals to the machine tool and controlling its heavy current circuits.

The M, S and T functions serve to effect principal control of the machine tool and the control operations have to be carried out accurately because an erroneous operation would produce serious trouble, such as a breakdown of the machine tool or damage to an expensive workpiece. However, since data transfer between the NC apparatus and the machine tool is usually effected by parallel transfer which does not involve parallel-serial conversion and is high in transfer rate, and since a number of transmission lines and relays corresponding in number thereto are used, there are some occasions when a faulty signal is sent out owing to breakage of the transmission line or a breakdown of the relay. In such a case, according to a conventional arrangement, the faulty signal may be applied as it is to a heavy current circuit on the side of the machine tool to cause an erroneous operation. That is to say, in a prior art NC machine tool, such as for instance the one shown in FIG. 1, by which numeric codes following address characters M, S and T indicating the kinds of functions are transmitted in parallel via transmission lines $l_1$ to $l_n$ having connected thereto relay circuits (not shown), is provided for each function on the side of the NC apparatus. A code signal sent out from the code sending circuit is received and decoded following a strobe signal sb in a decoding circuit 11 provided on the side of the machine tool, and the decoded signal is applied to the heavy current circuit of the machine tool. Accordingly, even if a wrong code is transmitted and received due to, for example, breakage of a transmission line $l_1$ to $l_n$ or breakdown of a relay, since no error detecting means is provided on the receiving side, the machine tool operates following the wrong code.

SUMMARY OF THE INVENTION

The present invention is intended to overcome such a defect of the prior art and has for its object to ensure the operations of the M, S and T functions, thereby to prevent accidents resulting from malfunctioning. According to the machine tool of the present invention, a numeric code sent from an NC apparatus to the side of the machine tool is added or combined with a redundant signal for checking its validity, and the machine tool is operated only when it is decided, based on the added signal on the side of the machine tool, that the received code is valid. With such an arrangement, even if a parallel transmission system using many signal lines is employed, it is possible to offer an NC machine tool which is capable of preventing erroneous operations related to the M, S and T functions and hence the NC machine tool is of high reliability.

DESCRIPTION OF THE PREFERRED EMBODIMENTS

For a detailed description of the present invention, its embodiment will hereinafter be described in detail.

Figure 1:
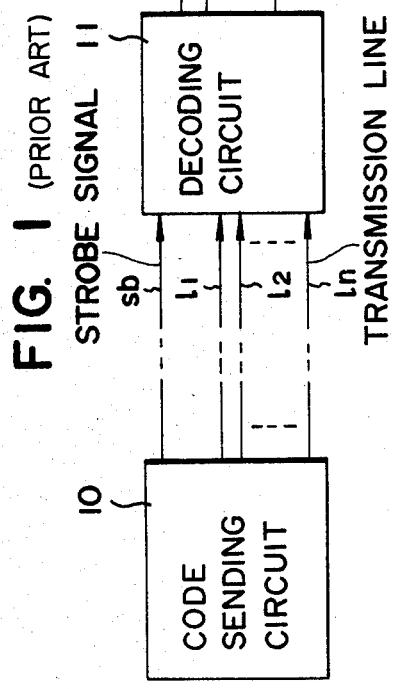
FIG. 1 is a diagram showing the arrangement of signal transmitting and receiving equipment in a conventional NC machine tool.
Figure 2:
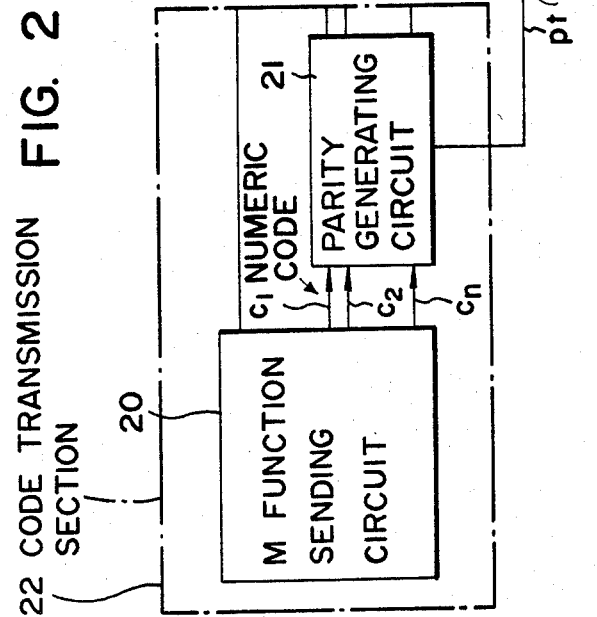
FIG. 2 is a block diagram illustrating the principal part of an embodiment of signal transmitting and receiving equipment of the NC machine tool according to the present invention.

FIG. 2 is a block diagram illustrating the principal part of an embodiment of signal transmitting and receiving equipment of an NC machine tool according to the present invention. Reference numeral 20 indicates an M function sending circuit; 21 designates a parity generating circuit; 22 identifies a code transmission section; 23 denotes a decoding circuit; 24 represents a parity check circuit; 25 shows a code reception and identification section; $c_1$ to $c_n$ refer to numeric codes; $l_1$ to $l_n$ indicate transmission lines; sb designates a strobe signal; pt identifies a parity check signal; am denotes an alarm signal; and $d_1$ to $d_n$ represent decoded signals.

In FIG. 2, when an input circuit or an arithmetic processing section (not shown) applies numeric codes following the address character M (indicating the M function) to the function sending circuit 20, the M function sending circuit 20 sends out the numeric codes $c_1$ to $c_n$, for instance, as relay contact signals, to the receiving side via the parity generating circuit 21 and the transmission lines $l_1$ to $l_n$, to which are connected relay circuits (not shown). At the same time, the M function sending circuit sends out the strobe signal sb directly to the receiving side. At this time, the parity generating circuit 21 generates the parity check signal pt in accordance with the contents of the numeric codes $c_1$ to $c_n$, which signal is transmitted to the receiving side. The parity generating circuit 21 may be an even parity generating circuit in which the total number of ON signals of numeric codes and parity check signals is even, or an odd parity generating circuit in which the total number of ON signals is odd.

Incidentally, the M function sending circuit 20 and the parity generating circuit 21 constitute an M function code transmission section, and such a transmission section is provided on the side of the NC apparatus for each of the M, S and T functions.

On the receiving side, a parity check is effected by the parity check circuit 24 based on the received numeric codes $c_1$ to $c_n$ and parity check signal pt, thereby deciding the validity of the received signal. If the received signal is determined to be valid by the parity check, the received numeric codes are applied to the decoding circuit 23 and its decoded outputs $d_1$ to $d_n$ are provided to the heavy current circuit on the side of the machine tool, wherein the predetermined M function is performed. If the received signal is determined to be invalid by the parity check, however, the alarm signal am is yielded and the machine tool does not operate. Accordingly, there is no possibility of a faulty operation being introduced as in the prior art; namely, the operation of the M, S and T functions can be ensured.

The decoding circuit 23 and the parity check circuit 24 constitute the M function code reception and identification section 25, and such a reception and identification section is provided on the side of the machine tool for each of the M, S and T functions.

Although the foregoing embodiment is arranged so that the validity of the numeric codes is decided by adding thereto a parity bit, it is also possible to employ an arrangement of wherein a signal other than a parity check signal is added as a redundant signal so that the validity of the code can be checked. Furthermore, the present invention is not limited specifically to an NC machine tool equipped with all of the M, S and T functions but may also be applied to an NC machine tool equipped with only one of them.

As will be appreciated from the foregoing description, according to the present invention, numeric codes that are sent from an NC apparatus to a machine tool are added with a redundant signal which permits checking of their validity, and only when the received signal is validated after reception based on the added signal is the machine tool operated. Accordingly, even if a parallel transmission system using many signal lines is employed, it is possible to offer an NC machine tool which is capable of preventing malfunctioning related to the M, S and T functions and preventing accidents without losing simplicity and other advantages of the parallel transmission system and hence the NC machine tool has a high degree of reliability.

What we claim is:

1. A numerical control system which is equipped to perform at least one of M, S and T functions, comprising:

a numerical controller having a code transmission means for combining a numeric code following an address character indicating one of the M, S and T functions with a redundant signal for checking the validity of the numeric code;

a plurality of transmission lines for conveying the numeric code with the redundant signal from the numerical controller;

a machine tool connected to said transmission lines, said machine tool having a code reception and identification means for receiving the signal from the code transmission means, said code reception and identification means including means for checking the validity of the received signal based on the numeric code indicating one of the M, S and T functions and the validity checking redundant signal; and decoding means for decoding the numeric code and providing it to a heavy current circuit of the machine tool in response to the numeric code being determined valid and for generating an alarm signal to keep the machine tool out of operation in response to the numeric code being determined invalid.

2. A numerical control system as in claim 1, wherein said code transmission section means comprises function sending circuit means for generating a strobe signal and emitting said numeric code when a predetermined function is to be performed, and parity generating circuit means for combining a parity check signal with said numeric code, both the strobe signal and the numeric code with the parity check signal being applied to said plurality of transmission lines, and wherein said code reception and identification section means comprises parity check circuit means for receiving the numeric code with the parity check signal and generating an alarm signal if parity does not check, and a decoding circuit which receives the strobes signal and the numeric code.

3. A numerical control system as in claim 1, wherein the system is equipped with more than one of the M, S, and T functions, wherein the numerical controller has a code transmission section means for each of the functions, and wherein the machine tool has a code reception and identification section means for each of the functions.

* * * * *

UNITED STATES PATENT AND TRADEMARK OFFICE
CERTIFICATE OF CORRECTION

PATENT NO. : 4,511,975

DATED : April 16, 1985

INVENTOR(S) : Nozawa et al.

It is certified that error appears in the above-identified patent and that said Letters Patent is hereby corrected as shown below:

Column 1, line 47, "1" should be -- $\ell$ -- (both occurrences);
         line 56, "1" should be -- $\ell$ -- (both occurrences).

Column 2, line 32, "1" should be -- $\ell$ -- (both occurrences);
         line 39, after "the" (first occurrence) insert --m--;
         line 44, "1" should be -- $\ell$ -- (both occurrences).

Column 3, line 7, "tion" should be --tions--;
         line 16, delete "of".

Signed and Sealed this

Seventeenth Day of September 1985

[SEAL]

Attest:

DONALD J. QUIGG

Attesting Officer

Commissioner of Patents and
Trademarks—Designate